United States Patent
Leblang

(10) Patent No.: US 8,942,974 B1
(45) Date of Patent: Jan. 27, 2015

(54) METHOD AND SYSTEM FOR DETERMINING DEVICE SETTINGS AT DEVICE INITIALIZATION

(75) Inventor: Jonathan A. Leblang, Menlo Park, CA (US)

(73) Assignee: Amazon Technologies, Inc., Reno, NV (US)

( * ) Notice: Subject to any disclaimer, the term of this patent is extended or adjusted under 35 U.S.C. 154(b) by 495 days.

(21) Appl. No.: 13/041,213

(22) Filed: Mar. 4, 2011

(51) Int. Cl.
*G06F 17/20* (2006.01)
*G06F 17/28* (2006.01)

(52) U.S. Cl.
USPC ..... 704/8; 704/9; 704/5; 704/231; 704/270.1; 704/251

(58) Field of Classification Search
CPC .. G10L 15/005; G10L 15/02; H04N 1/00204; H04N 1/00464; H04N 1/00498; H04N 1/00501; H04N 2201/0039; G06F 17/275; G06F 17/30401; G06F 9/4448; H04M 2203/2061; H04M 2203/6045
USPC ............................ 704/270, 270.1, 275, 7–10
See application file for complete search history.

(56) References Cited

U.S. PATENT DOCUMENTS

| | | | | |
|---|---|---|---|---|
| 6,661,466 B1 * | 12/2003 | Kou | | 348/553 |
| 6,675,143 B1 * | 1/2004 | Barnes et al. | | 704/257 |
| 6,678,659 B1 * | 1/2004 | Van Kommer | | 704/260 |
| 7,386,438 B1 * | 6/2008 | Franz et al. | | 704/8 |
| 7,412,374 B1 * | 8/2008 | Seiler et al. | | 704/8 |
| 7,630,974 B2 * | 12/2009 | Remahl et al. | | 1/1 |
| 7,937,336 B1 * | 5/2011 | Maynard-Zhang et al. | | 706/12 |
| 8,069,030 B2 * | 11/2011 | Iso-Sipila et al. | | 704/3 |
| 8,381,256 B2 * | 2/2013 | Kato | | 725/110 |
| 8,548,797 B2 * | 10/2013 | Kim et al. | | 704/8 |
| 2002/0120568 A1 * | 8/2002 | Leblang et al. | | 705/40 |
| 2002/0152163 A1 * | 10/2002 | Bezos et al. | | 705/40 |
| 2003/0187681 A1 * | 10/2003 | Spain | | 705/1 |
| 2004/0085570 A1 * | 5/2004 | Sfaelos et al. | | 358/1.15 |
| 2005/0192794 A1 * | 9/2005 | Ertemalp et al. | | 704/8 |
| 2007/0035632 A1 * | 2/2007 | Silvernail et al. | | 348/211.3 |
| 2007/0061222 A1 * | 3/2007 | Allocca et al. | | 705/26 |
| 2007/0124202 A1 * | 5/2007 | Simons | | 705/14 |
| 2008/0033945 A1 * | 2/2008 | Jassy et al. | | 707/6 |
| 2008/0126077 A1 * | 5/2008 | Thorn | | 704/8 |
| 2008/0281577 A1 * | 11/2008 | Suzuki | | 704/2 |
| 2010/0036912 A1 * | 2/2010 | Rao | | 709/204 |
| 2010/0088086 A1 * | 4/2010 | Hughes et al. | | 704/8 |
| 2010/0169074 A1 * | 7/2010 | Hung et al. | | 704/8 |
| 2011/0003620 A1 * | 1/2011 | Scott et al. | | 455/566 |
| 2011/0231528 A1 * | 9/2011 | Ishii | | 709/220 |
| 2012/0010886 A1 * | 1/2012 | Razavilar | | 704/246 |
| 2012/0030562 A1 * | 2/2012 | Tsai et al. | | 715/236 |
| 2012/0165048 A1 * | 6/2012 | Zhu | | 455/466 |
| 2012/0166367 A1 * | 6/2012 | Murdock et al. | | 706/12 |

OTHER PUBLICATIONS

Genichiro Kikui;Yoshihiko Hayashi;Seiji Suzaki, Cross-lingual Information Retrieval on the WWW, 1996, In Proceedings of the First Workshop on Multilinguality in Software Engineering: The AI Contribution (MULSAIC).*

* cited by examiner

*Primary Examiner* — Abdelali Serrou
(74) *Attorney, Agent, or Firm* — Lowenstein Sandler LLP

(57) ABSTRACT

A device searches for an available network. The device automatically sends a request message to an identified available network. After the device receives a response message from the identified available network, the device selects a language and/or other device setting based on contents of the response message.

26 Claims, 8 Drawing Sheets

METHOD AND SYSTEM FOR DETERMINING DEVICE SETTINGS AT DEVICE INITIALIZATION

BACKGROUND OF THE INVENTION

Many electronic devices support multiple languages. For such electronic devices, a correct language must be selected for a user so that the device can present information to the user in a language that the user understands. Accordingly, some manufacturers pre-configure devices that will be sold in a particular region to use a dominant language for that particular region. However, by manufacturing different devices for different regions, manufacturing costs are increased. Other manufacturers provide a list of all possible languages when the device is initialized, and require a user to scroll through the language options to select a desired language. However, this can be cumbersome for a user.

BRIEF DESCRIPTION OF THE DRAWINGS

The embodiments described herein will be understood more fully from the detailed description given below and from the accompanying drawings. These drawings are for explanation and understanding only, and should not be taken to limit the application to the illustrated embodiments.

DETAILED DESCRIPTION OF THE PRESENT INVENTION

Methods and systems for automatically identifying and/or selecting a language and/or other device settings for a device are described herein. In one embodiment, a device searches for available networks (e.g., a wireless local area network (WLAN) hotspot or a wired network). The device automatically sends a request message to an identified available network. In one embodiment, the device sends a webpage request for a remote webpage to the wireless network. The device receives a response message from the wireless network. In one embodiment, the response message is a portal page of a captive portal used by the wireless network. The portal page may provide terms of use, identify the wireless network provider, request login information, and/or include additional information. The device selects a language based on contents of the response message. In one embodiment, the device parses the portal page and compares words included in the portal page to entries in a multi-language dictionary. Once a match is found between words on the portal page and a particular language's entries in the multi-language dictionary, that particular language may be selected for use by the device. The device may also select other device settings such as a location, time zone, measurement system, time keeping system, currency system, etc.

Described herein are embodiments of the present invention in which a device can automatically identify and select a language and/or additional device settings with little or no user input. This speeds up and simplifies device initialization, and reduces or eliminates any operations that a user needs to perform to configure the device after the device is purchased.

Figure 1:
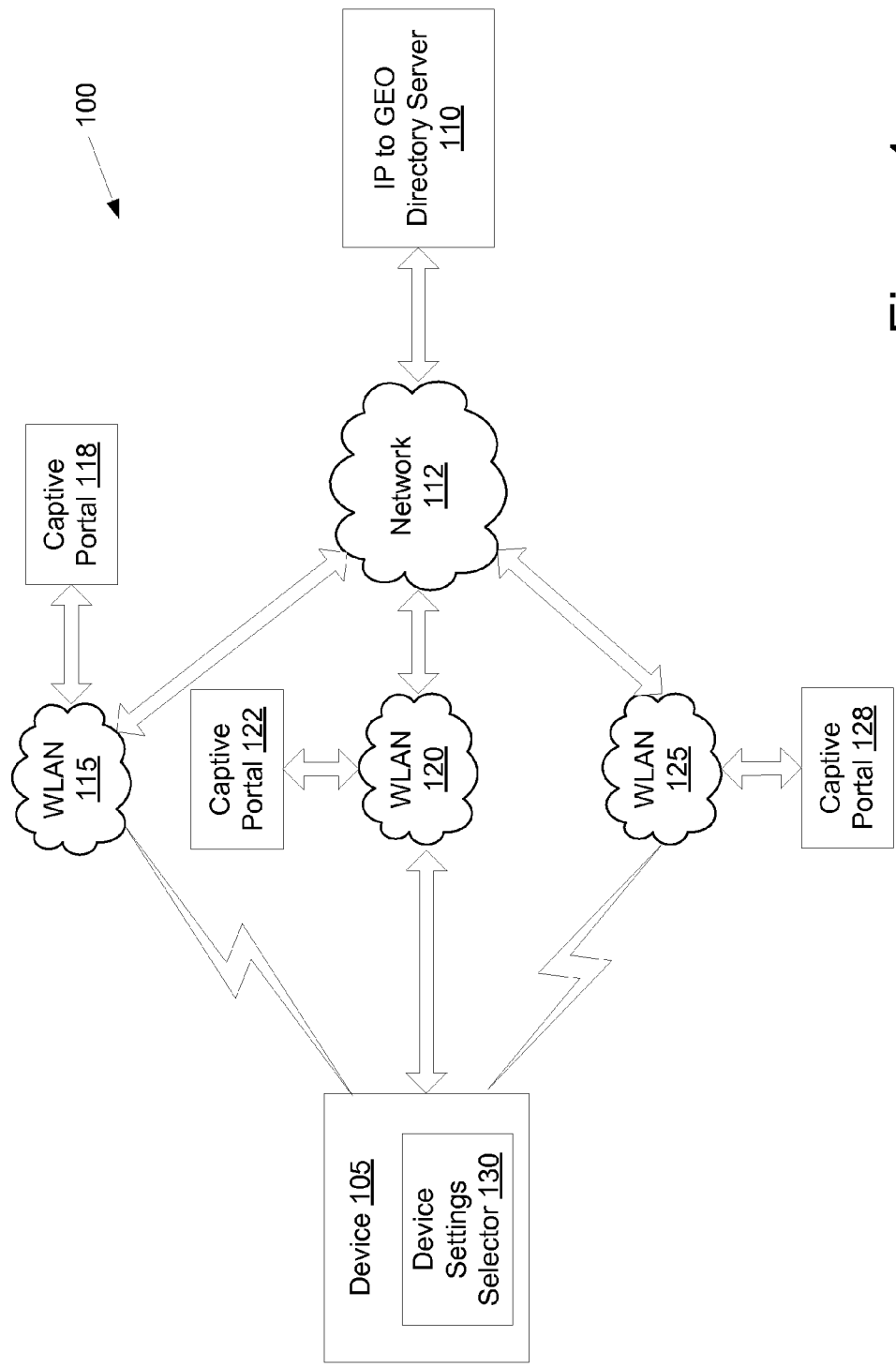
FIG. 1 is a block diagram of an exemplary network architecture, in which embodiments of the present invention may operate.

FIG. 1 is a block diagram of an exemplary network architecture 100, in which embodiments described herein may operate. The network architecture 100 includes one or more wireless networks (e.g., wireless local area networks (WLANs) 115, 125) and a wired local area network (LAN) 120 connected to a network 112, which may include a public network such as the Internet, a private network such as a local area network (LAN), or a combination thereof. In one embodiment, the WLANs 115, 125 are wireless fidelity (WiFi) hotspots. For example, WLAN 115 may be a public WiFi hotspot provided by a wireless service provider (e.g., AT&T® or Verizon®) and WLAN 125 may be a WiFi hotspot of a private residence. Note that WLANs 115, 120, 125 may also use other wireless technologies, such as Bluetooth® or Zigbee®. In one embodiment, LAN 120 is provided by an organization such as a local library, a hotel, a corporation, etc.

The network architecture 100 further includes a device 105 that may wirelessly connect to one or more of the WLANs 115, 125 and/or may establish a wired connection to LAN 120 (e.g., via an Ethernet cable). In one embodiment, device 105 is a user device, which may be a portable computing device such as an electronic book reader device or a tablet computer. Other examples of portable computing devices include cellular telephones, personal digital assistants (PDAs), portable media players, netbooks, and the like. The device 105 may also be a non-portable computing device such as a desktop computer, a television, a set-top box associated with a television, a gaming console, a digital video disc (DVD) player, and so on. In one embodiment, device 105 is an electronic non-user device. Examples of non-user devices include security cameras, automated manufacturing machines, electronic billboards, or other automated devices that don't require user interaction.

The device 105 includes a device settings selector 130, which may be implemented in hardware, software, firmware, or a combination thereof. The device settings selector 130 includes functionality to find and access available networks (e.g., WLANs 115, 125 and LAN 120). In one embodiment, the device settings selector 130 searches for wired networks and/or unencrypted wireless networks. Once the device settings selector 130 identifies an unencrypted wireless network or a wired network, the device settings selector 130 causes the device 105 to connect to that network. For example, if WLAN 115 was an encrypted wireless network, but WLAN 125 was an unencrypted wireless network, then device settings selector 130 would cause device to connect to WLAN 125. Additionally, if device 105 was wired to LAN 120, device settings selector 130 would cause device 105 to connect to LAN 120.

The device settings selector 130 further includes functionality to identify and select a language based on information received from the one or more networks. Most public wireless networks and wired networks include a captive portal. In the illustrated example, WLAN 115 includes captive portal 118, LAN 120 includes captive portal 122 and WLAN 125 includes captive portal 128. A captive portal includes a firewall, a redirect server and a portal page. The firewall intercepts all packets, regardless of access or port, until a device satisfies some network access criteria. The redirect server redirects a request to access a network address (e.g., a webpage request) to the portal page. The portal page is a hypertext markup language (HTML) page that may include a user login, payment request and/or a request for user acknowledgement of terms of use. An example portal page is shown below in FIG. 3. Returning to FIG. 1, the device settings selector 130 may use information included in the portal page to identify and/or select a language. For example, if the portal page is presented in English, then the device settings selector may select English. Device settings selector 130 may also use the contents of other web pages or response communications to identify and/or select a language. Additionally, the device settings selector 130 may select other settings such as a geographic location, time zone, time keeping system, currency system, measurement system, etc. based on the contents of the portal page and/or based on the selected language.

In one embodiment, an internet protocol (IP) to geographic location (GEO) directory server 110 is connected to the network 112. The IP to GEO directory server 110 includes a directory that associates IP addresses to geographic locations. Clients (e.g., device 105) may send queries to the IP to GEO directory server 110 that include an IP address. The IP to GEO directory server 110 may then identify a corresponding geographic location associated with the received IP address, and send a response to the client that includes the identified geographic location. The IP to GEO directory server 110 can identify a country, region and/or city associated with a particular IP address.

In one embodiment, device settings selector 130 queries IP to GEO directory server 110 when it discovers an unencrypted wireless network (e.g., WLAN 125) or an available wired network. If the wireless network or wired network includes a captive portal, then the device 105 will receive a portal page in response to the query. Device settings selector 130 may then identify and/or select a language and/or other device settings based on the contents of the portal page. If the network does not include a captive portal, then IP to GEO directory server 110 responds to the query by notifying device 105 of a current geographic location for the device 105. Device settings selector 130 may then select the geographic location and identify and/or select a language associated with the current geographic location.

Figure 2:
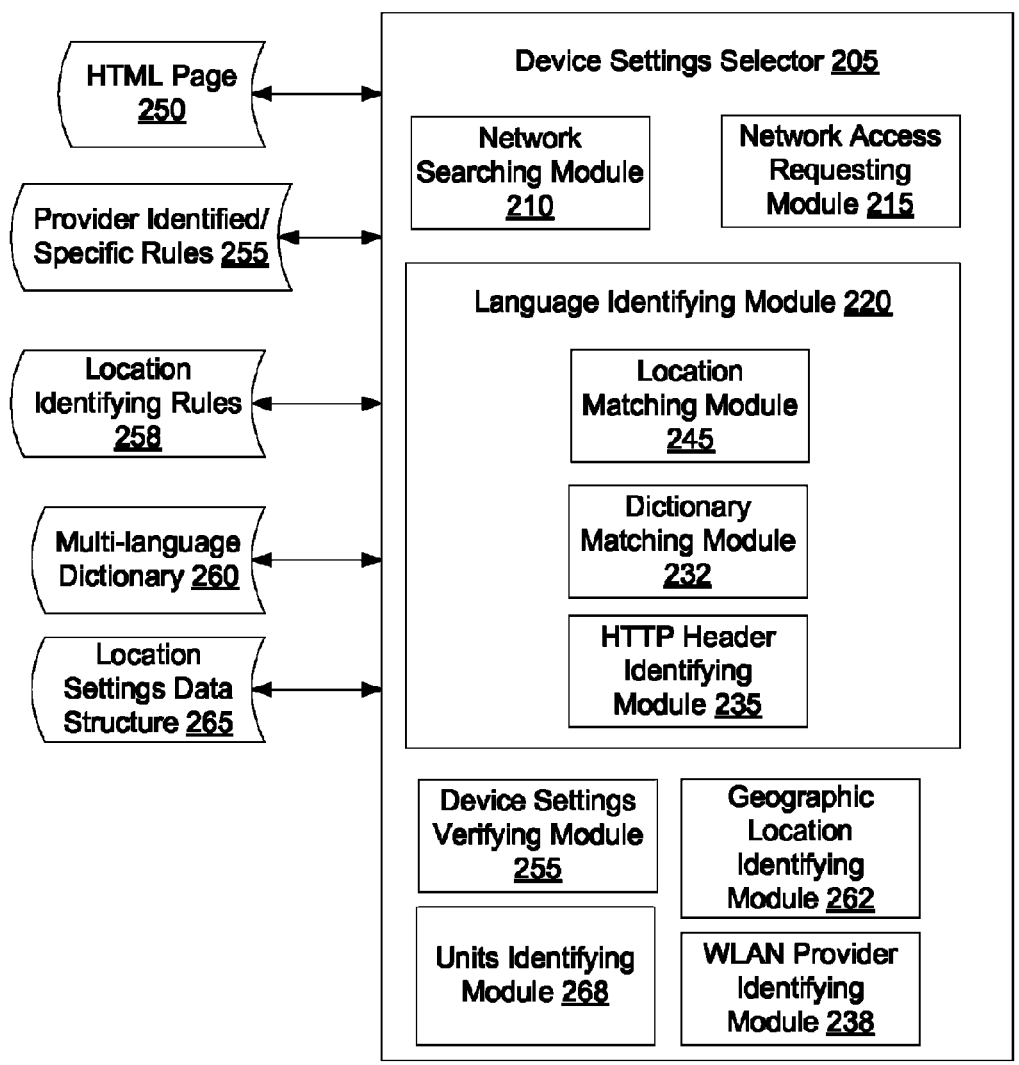
FIG. 2 is a block diagram of one embodiment of device settings selector.

FIG. 2 illustrates a device settings selector 205, in accordance with one embodiment of the present invention. In one embodiment, the device settings selector 205 corresponds to device settings selector 130 of FIG. 1. The device settings selector 205 may include a network searching module 210, a network access requesting module 215 and language identifying module 220. Additionally, the device settings selector 130 may include a device settings verifying module 255, a geographic location identifying module 262 and/or a units identifying module 268. Note that in embodiments of the present invention, the described modules can be combined together or separated into further modules. Therefore, the division of functionality between these modules may be modified from what is described below.

Network searching module 210 searches for available wireless networks and wired networks. In one embodiment, network searching module 210 searches for available wireless networks that are not encrypted.

Once network searching module 210 identifies an available network, network access requesting module 215 requests network access from the network. In one embodiment, network access requesting module 215 attempts to access a known network address, such as a network address of an IP to GEO directory server. For example, network access requesting module 215 may request an HTML page of an IP to GEO directory server. In response to making the network access request, the network access requesting module 215 receives a response message, which may include an HTML page 250 or a hypertext transport protocol (HTTP) error message. The HTML page 250 may be associated with the requested network address, or may be a portal page provided by a captive portal attached to the wireless network.

Language identifying module 220 analyzes the response message (e.g., the HTML page 250 or HTTP error message) to identify a language. In one embodiment, language identifying module 220 includes a hypertext transport protocol (HTTP) header identifying module 235, a dictionary matching module 232 and a location matching module 245.

HTML pages include HTML code and HTTP headers. One standard HTTP header is a language header that identifies a language used for the HTML page. In one embodiment, HTTP header identifying module 235 reads the HTTP language header of a received HTML page 250 to identify a particular language and reports the particular language to language identifying module 220. Language identifying module 220 may then select the identified particular language for the device.

Unfortunately, HTTP language headers are often incorrect. When an HTML page is developed, the HTML page typically has a default language selected in the HTTP language header. If a developer fails to update the HTTP language header to identify a language used for the HTML page, then the HTTP language header may report the wrong language. For example, a default language for an HTTP language header may be English, but the HTML page may be written in Spanish. Accordingly, in one embodiment, language identifying module 220 or HTTP header identifying module 235 assigns a confidence rating to the language identified by HTTP header identifying module 235. In one embodiment, the confidence rating associated with the identified language is a low confidence rating (e.g., a rating of 40 out of 100).

In one embodiment, dictionary matching module 232 parses the response message (e.g., the HTML code of a received HTML page 250) into individual words or collections of words. The dictionary matching module 232 then compares the parsed words from the HTML page 250 (or other response message) to entries in a multi-language dictionary 260. Dictionary matching module 232 may then identify a particular language based on word matches to entries in the multi-language dictionary 260 associated with the particular language.

The multi-language dictionary 260 is a data structure that relates words to languages. In one embodiment, the multi-language dictionary 260 is a lookup table having multiple entries, where each entry associates a word with a particular language. Alternatively, the multi-language dictionary 260 may be another type of data structure that relates words to languages, such as a list or collection of key value pairs. The multi-language dictionary 260 may include entries for words commonly included in portal pages. Examples of such commonly used words include wireless, internet, login, accept, click, read, accept, policy, here, register, terms, usage, and so forth. In one embodiment, multi-language dictionary 260 includes 50-100 words in each of the languages that the device supports. Alternatively, the multi-language dictionary 260 may include greater or fewer words in each of the supported languages. Each entry in the multi-language dictionary 260 may be for a common word in one of the multiple languages supported by the multi-language dictionary 260. For example, there may be separate entries for the word login in English, Chinese, Spanish, French, Italian, Japanese, and so forth.

Dictionary matching module 232 may determine a confidence rating for an identified language. The confidence rating may be computed based on a number of matches made to the language. The more matches that are made to entries for a particular language, the higher the confidence rating. For example, if ten English words were identified in the HTML page, then a high confidence rating may be assigned to the English language identification. However, if only two matches were found, then a low confidence rating may be assigned to the English determination.

Dictionary matching module 232 may identify matches to multiple languages. For example, dictionary matching module 232 may find matches for both English and Spanish words. In one embodiment, the confidence rating for a language is reduced based on the number of matches that are made to other languages. For example, if 15 matches are made to English words and 13 matches are made to Spanish words, then there may be a lower confidence that the HTML page is in English than if there were no matches made to Spanish words. In such an instance, the dictionary matching module 232 may report two languages for the HTML page, and a different confidence rating for each of those languages.

In one embodiment, location matching module 245 uses geographic location information to identify a language. Location matching module 245 may receive the geographic location information from geographic location identifying module 262 (described in greater detail below). The geographic location information may include an address, a country, a province or state, a longitude and latitude, or other location information such as a zip code.

In one embodiment, location matching module 245 identifies a language associated with the identified location by searching for the location in a location settings data structure 265. The location settings data structure 265 associates locations to languages commonly spoken at those locations. Location settings data structure 265 may also associate additional information to locations, such as a currency system, time keeping system, measurement system, and so forth. In one embodiment, location settings data structure 265 is a table (e.g., a lookup table). Alternatively, location settings data structure 265 may be a list, collection of key value pairs, or other data structure.

Location matching module 245 may identify a language commonly spoken at the identified location based on an entry in the location settings data structure 265. Location matching module 245 may then report the identified language to language identifying module 220. In one embodiment, location matching module 245 or language identifying module 220 assigns a confidence rating to the identified location. In one embodiment, the confidence rating assigned to the identified language depends on a confidence rating that is assigned to the received location information.

Language identifying module 220 selects a language from the languages identified by the dictionary matching module 232, location matching module 245 and/or HTTP header identifying module 235. If location matching module 245, dictionary matching module 232 and/or HTTP header identifying module 235 all report the same language, then language identifying module 245 may select that language. However, if different languages are reported, language identifying module 220 may choose one of the identified languages. In one embodiment, each reported language is associated with a confidence rating. Language identifying module 240 may select the language that is associated with the highest confidence rating. In one embodiment, language identifying module 220 only selects a particular language for the HTML page if the confidence rating for that language exceeds a confidence threshold (e.g., if at least five or some other predetermined number of matches are found for a language). In one embodiment, language identifying module 220 ranks multiple reported languages based on their associated confidence ratings. The multiple reported languages may then all be presented to a user in ranked order for a user selection.

Geographic location identifying module 262 uses one or multiple articles of information to determine a current geographic location for a device. In one embodiment, geographic location identifying module 262 parses a response message (e.g., HTML page 250) into passages that include multiple words (e.g., into sentences, or other collections of multiple words). Geographic location identifying module 262 compares the parsed contents to one or more location identifying rules 258. An example location identifying rule may cause the geographic location identifying module 262 to search for passages that include addresses (e.g., passages that include a number followed by a word and a subsequent label such as rd., st., pl., rte., route, place, road, street). Location identifying rules 258 may also include regional identifiers such as state names and abbreviations, province names and abbreviations, country names and abbreviations, zip codes and so forth. Therefore, a location identifying rule may be used, for example, to identify the text 1102 Parker place as an address.

As discussed above, network access requesting module 215 may receive an HTML page provided by an IP to GEO directory server. If such an HTML page is received, the HTML page may include a current location of the device in which the device settings selector 205 is included.

In one embodiment, the device includes a global positioning system (GPS) receiver. The GPS receiver may be used to determine a latitude and longitude of the device. In one embodiment, the GPS receiver reports the latitude and longitude to the geographic location identifying module 262.

In some embodiments, as discussed above, the language identifying module 220 uses location information reported by the geographic location identifying module 262 to identify a language or collection of potential languages. Alternatively, language identifying module 220 may report an identified language to geographic location identifying module 262. Geographic location identifying module 262 may then identify one or more locations based on the identified language. In one embodiment, geographic location identifying module 262 uses location settings data structure 265 to identify and/or select one or more locations where a selected language is a dominant language. For example, if the selected language is German, then the geographic location identifying module 262 may determine a list of countries at which the device might be located that include Germany, Austria and Switzerland. Alternatively, if the selected language is French, then the list of countries may include France, Belgium, Switzerland and Canada.

In one embodiment, geographic location identifying module 262 assigns a confidence rating to an identified location or locations. The confidence rating may be based on how the location was determined. For example, if the location was determined based on information received from a GPS receiver, then the confidence rating for the identified location may be high (e.g., a rating of 10 out of 10). However, if the location was determined based on an identified language, then the confidence rating associated with the identified location may be low (e.g., a rating of 3 out of 10).

Units identifying module 268 identifies and/or selects one or more units of measurement. Examples of units of measurement that units identifying module 268 may identify include a currency system (e.g., U.S. dollars, British pounds, Swedish Kroner, European Union Euro, and so on), a time keeping system (e.g., 24 hour time or 12 hour time), a time zone, a measurement system (e.g., the metric system, Imperial measurement system, USA measurement system, etc.), and so forth. Units identifying module 268 may determine the one or more units of measurement based on an identified location. In one embodiment, units identifying module 255 finds an identified location in the location settings data structure 265, and identifies units of measurement associated with that location.

In one embodiment, device settings selector 205 includes a WLAN provider identifying module 238. WLAN provider identifying module 238 parses the received response message (e.g., HTML page 250), and compares parsed contents of the response message to one or more provider identifying rules or provider specific rules 275. Some WLAN providers such as T-Mobile®, Starbucks®, Vodaphone®, AT&T®, Sprint®, etc. provide many wireless networks. All of the wireless networks provided by a particular WLAN provider (e.g., Starbucks) may share a similar format and content for a portal page. Accordingly, the WLAN identifying module 238 may compare the parsed contents of the HTML page 250 to provider identifying rules 255 to determine whether the HTML page 250 resembles the portal page of a particular WLAN provider. If a particular provider is identified, then provider specific rules may be used to determine a language, location, or other information. For example, it may be known that a particular WLAN provider identifies a geographic location of each WLAN in a specific region of the portal page. This knowledge may be used to accurately identify a current location of the device.

In one embodiment, device settings selector 205 automatically sets the device to a language selected by language identifying module 220. This may include configuring an interface for a hardware device and/or software running on the device to use the selected language. The device settings selector 205 may also automatically set the device to a selected location, measurement system, time keeping system, currency system, and so on.

In one embodiment, device settings verifying module 255 prompts a user for confirmation that a selected language is the user's primary language. In one embodiment, device settings verifying module 255 presents a list of languages to the user, with the selected language appearing at the top of the list. Therefore, the user may simply press a single button to confirm the selected language. However, if the selected language is incorrect, then the user may scroll down to select a different language. If multiple languages were identified, then the multiple languages may be presented to the user ordered based on their associated confidence ratings. Therefore, in one embodiment, a user can easily select a language from a list of the most likely languages that the user may speak.

Device settings verifying module 255 may also prompt a user to select a location from a list of probable current locations. Device settings verifying module 255 may rank the locations based on associated confidence ratings and present the location to a user in ranked order. Additionally, the device settings verifying module 255 may prompt the user to verify a selected currency system, time keeping system, time zone, measurement system, and so on. In one embodiment, device settings verifying module 255 first prompts the user to verify a selected language and subsequently prompts the user to verify a selected location. The device settings verifying module 255 may then prompt the user to verify or select one or more additional settings.

There is a high chance that a user who first activates a device at an airport does not speak the language associated with the current location. Therefore, in one embodiment, geographic location identifying module 262 determines whether the current location is an airport location (e.g., by checking location settings data structure 265). If the current location is an airport location, then geographic location identifying module 262 may report to language identifying module 220 that the current location is an airport location. If an airport location is identified, language identifying module 220 may use a default language selection. Therefore, identified languages may be ignored if the current location is an airport location.

Network searching module 210 may find multiple available unencrypted wireless networks. Additionally, network searching module 210 may find an available wired network and an available wireless network. In one embodiment, network access requesting module 215 requests network access from more than one of those available networks. Language identifying module 220 may then determine languages based on response communications (e.g., HTML pages) received from each of the networks. Additionally, geographic location identifying module 262 and/or units identifying module 268 may determine locations and/or other device settings based on response message received from each of the wireless networks. Language identifying module 220 may then adjust confidence ratings for languages based on comparing the results. For example, if the same language is reported from analysis of two HTML pages, then a confidence rating associated with that language may be increased. However, if different languages are reported, then confidence ratings for those different languages may be decreased. As described above, device settings verifying 255 may present a list of multiple different probable languages to the user. These multiple languages may be selected from the analysis of response messages from multiple wireless networks.

Figure 3:
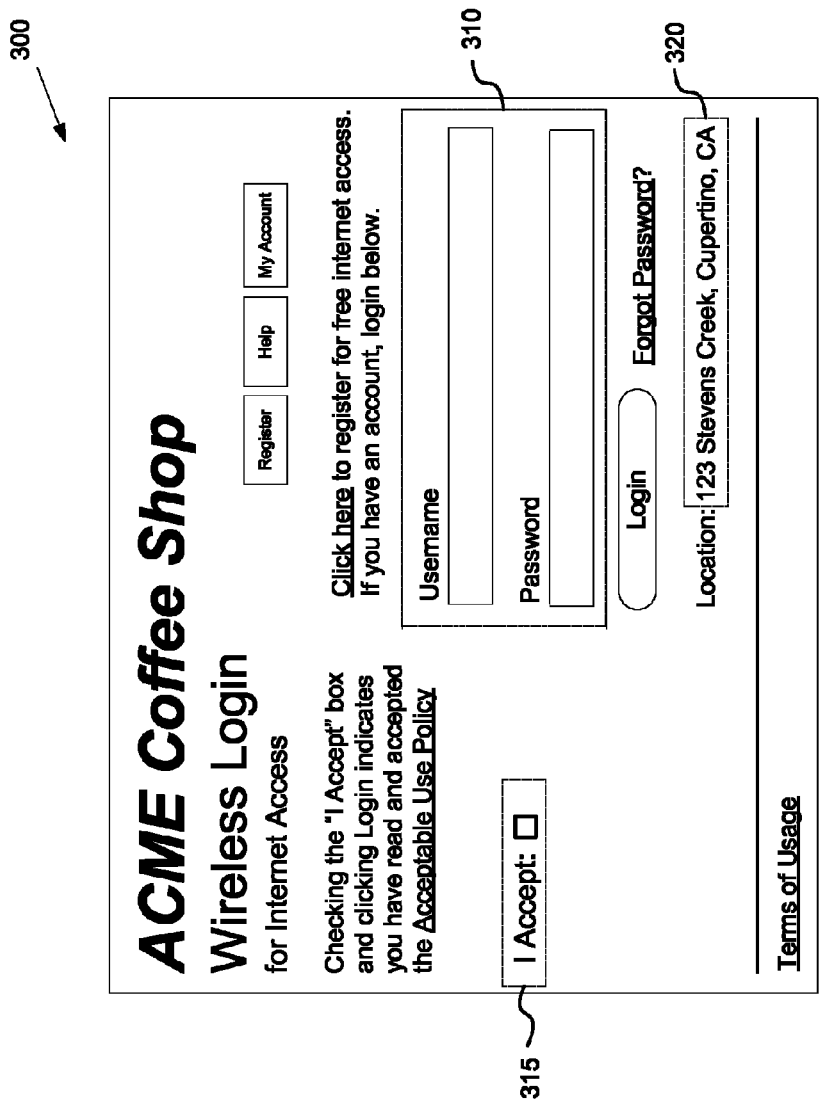
FIG. 3 illustrates an example portal page.

FIG. 3 illustrates an example portal page 300 that can be parsed by the device settings selector, in accordance with one embodiment of the present invention. As shown, the example portal page includes numerous terms that most portal pages include, such as wireless, login, accept, policy, usage, etc. The portal page 300 further includes a user policy acceptance button 315, a location 320 and a user login 310. The device settings selector previously described may parse the example portal page 300 and match entries to multiple English words included in the multi-language dictionary. Additionally, the device settings selector may identify the location 320, and determine a language associated with that location (e.g., English). Therefore, the device settings selector may select a language of English and a location of California, USA based on the contents of the portal page 300. Device settings selector may also select the USA measurement system, the Pacific time zone, the U.S. currency, etc. based on the contents of portal page 300.

Figure 4:
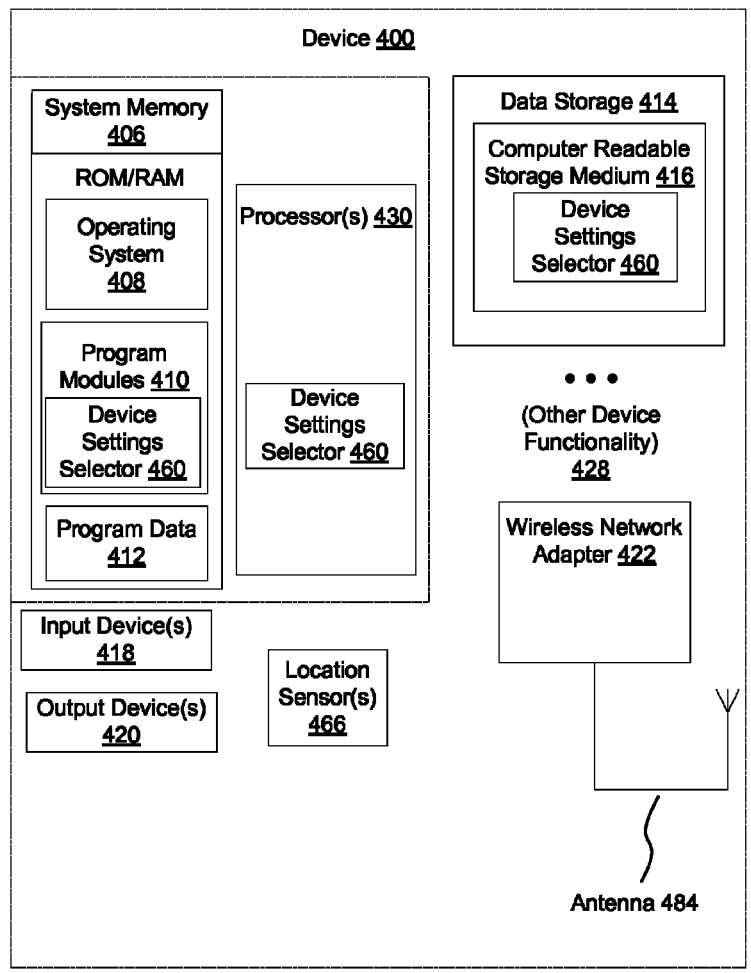
FIG. 4 is a block diagram illustrating an exemplary device, in accordance with one embodiment of the present invention.

FIG. 4 is a block diagram illustrating an exemplary device 400, in accordance with one embodiment of the present invention. The device 400 may correspond to the device 105 of FIG. 1 and may be any type of device such as an electronic book reader, a PDA, a mobile phone, a laptop computer, a portable media player, a tablet computer, an electronic pad, a desktop computer, a camera, a video camera, a netbook, or any type of non-user device.

The device 400 includes one or more processors 430, such as one or more CPUs, microcontrollers, field programmable gate arrays, or other types of processors. The device 400 also includes system memory 406, which may correspond to any combination of volatile and/or non-volatile storage mechanisms. The system memory 406 stores information which provides an operating system component 408, various program modules 410 such as device setting selector 460. The device 400 performs functions by using the processor(s) 430 to execute instructions provided by the system memory 406.

The device 400 also includes a data storage device 414 that may be composed of one or more types of removable storage and/or one or more types of non-removable storage. The data storage device 414 includes a computer-readable storage medium 416 on which is stored one or more sets of instructions embodying any one or more of the methodologies or functions described herein. As shown, instructions for the device settings selector 460 may reside, completely or at least partially, within the computer readable storage medium 416, system memory 406 and/or within the processor(s) 430 during execution thereof by the device 400, the system memory 406 and the processor(s) 430 also constituting computer-readable media. The device 400 may also include one or more input devices 418 (keyboard, mouse device, specialized selection keys, etc.) and one or more output devices 420 (displays, printers, audio output mechanisms, etc.).

The device 400 further includes a wireless network adapter 422 to allow the device 400 to communicate via a wireless network (e.g., via WiFi, Bluetooth or another wireless protocol) with other computing devices, such as remote computers, an item providing system, online book stores, electronic catalogs for libraries, and so forth. The wireless network adapter 422 may generate signals and send these signals to antenna 484 for transmission. In addition to sending data, antenna 484 also receives data, which is sent to wireless network adapter 422 and transferred to processor(s) 430. In one embodiment, device 400 also includes a wired network adapter (not shown).

In one embodiment, device 400 includes one or more location sensors 466, which may be used to determine a location of the device 400. One example of a location sensor is a GPS receiver. In one embodiment, the device settings selector 460 uses data from the location sensor(s) 466 to select a current location and/or a language associated with that location.

Figure 5:
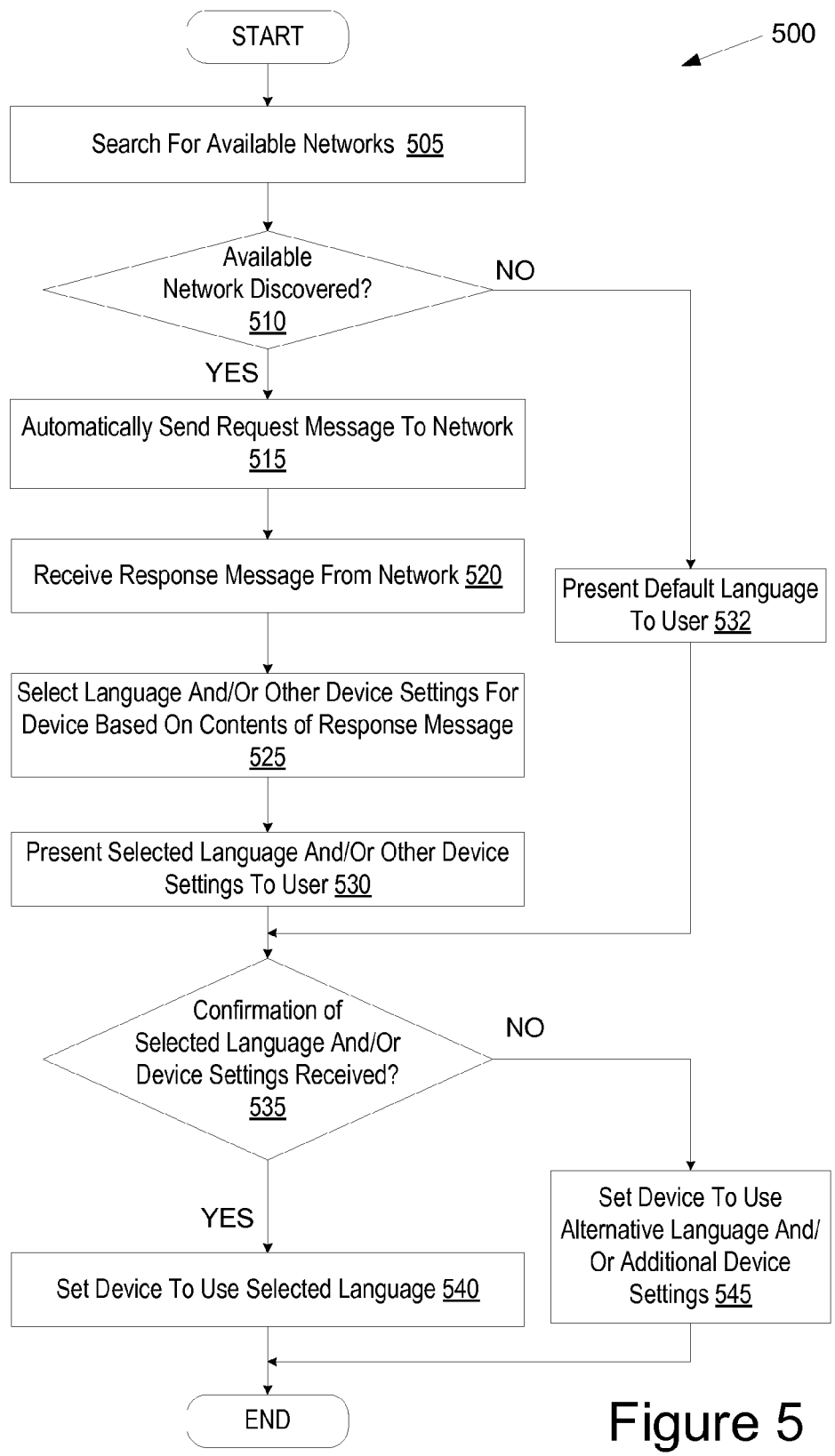
FIG. 5 is a flow diagram of one embodiment for a method of determining a language and/or additional device settings for a device.

FIG. 5 is a flow diagram of one embodiment for a method 500 of determining a language and/or additional device settings for a device. The method is performed by processing logic that may comprise hardware (circuitry, dedicated logic, etc.), software (such as is run on a general purpose computer system or a dedicated machine), or a combination of both. In one embodiment, method 500 is performed by a device (e.g., a device settings selector 120 running on device 105 of FIG. 1).

Referring to FIG. 5, at block 505 of method 500 processing logic searches for available networks. In one embodiment, processing logic searches for unencrypted wireless networks. Processing logic may also search for wired networks. At block 510, processing logic determines if an available network has been identified. An available network may be a wired network or an unencrypted wireless network. If no available networks are identified, the method proceeds to block 532, and a default language is presented to a user for verification. Alternatively, a list of languages may be presented to the user, and the user may select a language from the list. If an available network is identified, the method continues to block 515.

At block 515, processing logic sends a request message to an available network (e.g., to an identified unencrypted wireless network). The request message may be a request for a specific web page of a remote web server, or may be a request for other data. At block 520, processing logic receives a response message from the network. The response message may be a requested HTML page. Alternatively, the response message may be a portal page of a captive portal provided by the network.

At block 525, processing logic selects a language for the device based on contents of the response message. Processing logic may select the language based on an HTTP header in the response message, based on words or phrases included in the response message, or based on other information in the response message. In addition to selecting a language, processing logic may select other device settings such as location, currency system, time keeping system, measurement system, etc.

At block 530, processing logic presents the selected language and/or additional device settings to a user. At block 535, processing logic determines whether the user has confirmed the selected language and/or additional device settings. If the user confirms the selected language and/or additional device settings, processing logic sets the device to use the selected language and/or additional device settings at block 540. The user may also select a different language and/or additional device settings. At block 545, processing logic sets the device to any alternative language and/or device settings that were selected by the user. The method then ends.

Figure 6:
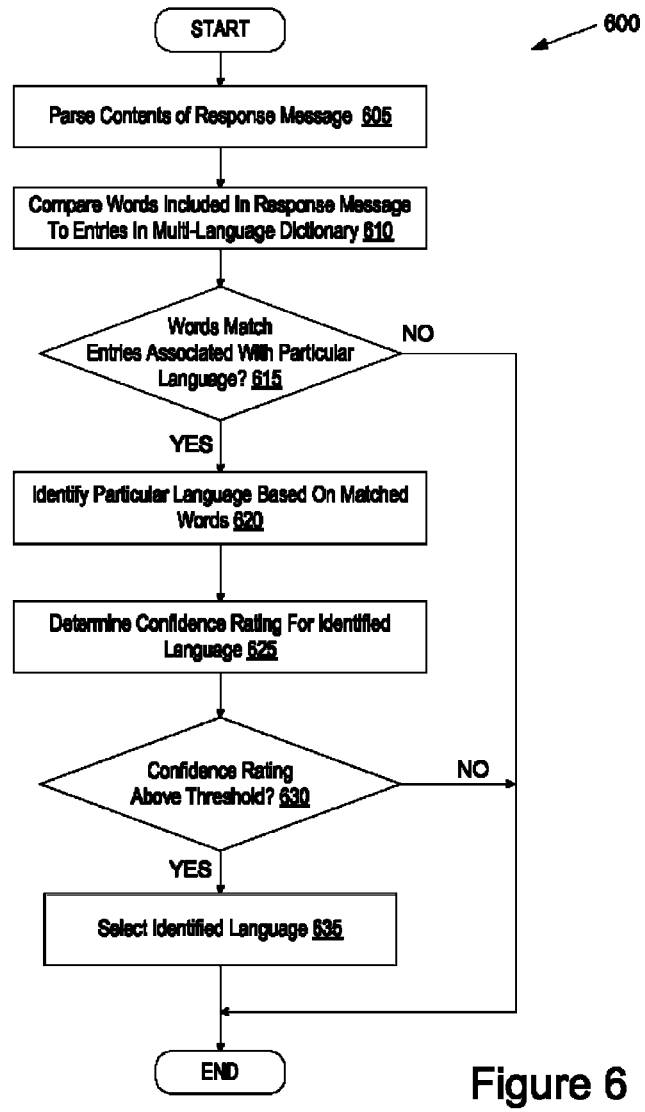
FIG. 6 is a flow diagram of one embodiment for a method of identifying a language for a device based on contents of a response message.

FIG. 6 is a flow diagram of one embodiment for a method 600 of identifying a language for a device based on contents of a response message. The method is performed by processing logic that may comprise hardware (circuitry, dedicated logic, etc.), software (such as is run on a general purpose computer system or a dedicated machine), or a combination of both. In one embodiment, method 600 is performed by a device (e.g., a device settings selector 120 running on device 105 of FIG. 1). In one embodiment, method 600 is performed at block 525 of method 500.

Referring to FIG. 6, at block 605 of method 600 processing logic parses the contents of a response message that has been received from a server. The response message may be, for example, an HTML page provided by a web server or an HTTP error message. In one embodiment, processing logic parses the contents of the response message into individual words. At block 610, processing logic compares words included in the response message to entries in a multi-language dictionary. The multi-language dictionary may be a lookup table or other data structure that associates common words to languages that the device supports. Each entry in the multi-language dictionary may include a word and a language. In one embodiment, the multi-language dictionary contains words that are commonly included in portal pages.

At block 615, processing logic determines whether words from the response message match entries in the multi-language dictionary associated with a particular language. If any words from the response message math an entry in the multi-language dictionary, the method continues to block 620. If no words in the response message match an entry in the multi-language dictionary, the method ends.

At block 620, processing logic identifies a particular language based on words from the response message that match entries for that particular language in the multi-language dictionary. In some instances, matches may be made to entries associated with multiple languages. When this occurs, processing logic may identify each of these languages.

At block 625, processing logic determines a confidence rating for the identified language or languages. At block 630, processing logic determines whether the confidence rating for the identified language (or for one of multiple identified languages) exceeds a confidence threshold. If the confidence rating for an identified language exceeds the confidence threshold, the method continues to block 635. Otherwise, the method may end. Alternatively, the method may continue to block 635 even if an identified language does not exceeds a confidence threshold.

At block 635, processing logic selects the identified language. If multiple identified languages exceeded the confidence threshold, then processing logic may select a language that is a associated with a highest confidence rating. The method then ends.

Figure 7:
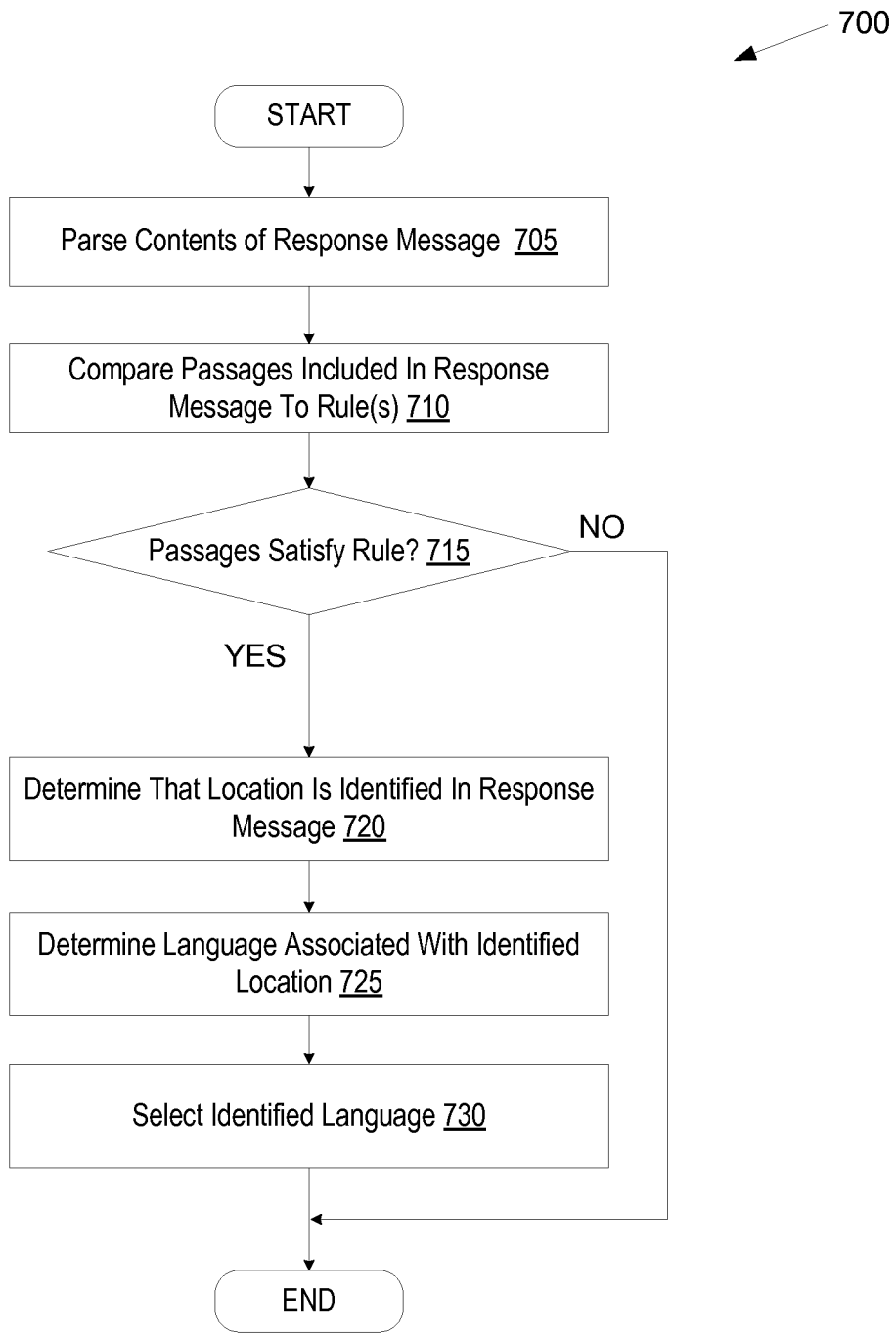
FIG. 7 is a flow diagram of another embodiment for a method of identifying a language for a device based on contents of a response message.

FIG. 7 is a flow diagram of another embodiment for a method 700 of identifying a language for a device based on contents of a response message. The method is performed by processing logic that may comprise hardware (circuitry, dedicated logic, etc.), software (such as is run on a general purpose computer system or a dedicated machine), or a combination of both. In one embodiment, method 700 is performed by a device (e.g., a device settings selector 120 running on device 105 of FIG. 1). In one embodiment, method 700 is performed at block 525 of method 500.

Referring to FIG. 7, at block 705 of method 700 processing logic parses the contents of a response message that has been received from a server. The response message may be, for example, an HTML page provided by a web server. In one embodiment, processing logic parses the contents of the response message into passages that may include a few words, a sentence, a paragraph, or another collection of characters. At block 710, processing logic compares the passages from the response message to one or more rules. The rules may include location identifying rules that are used to scan the response message for addresses, place names, or other location identifying information. The rules may also include provider identifying rules. Each provider identifying rule may be tailored to identify portal pages of a specific known wireless network provider.

At block 715, processing logic determines whether the passages satisfy any of the rules (e.g., any location identifying rules or provider identifying rules). If the passages satisfy a provider identifying rule or a location identifying rule, the method continues to block 720. Otherwise the method ends.

At block 720, processing logic determines a location that is identified in the response message based on the satisfied rule or rules. If the passage satisfied a provider identifying rule, then processing logic may use additional provider specific rules that can match the passages of the response message to a specific location and/or to a specific language. At block 725, processing logic determines a language that is associated with the identified language. In one embodiment, processing logic finds an entry for the identified language in a location settings data structure (e.g., a location settings table). The found entry may identify one or more languages spoken at that location. At block 730, processing logic selects the identified language. The method then ends.

Figure 8:
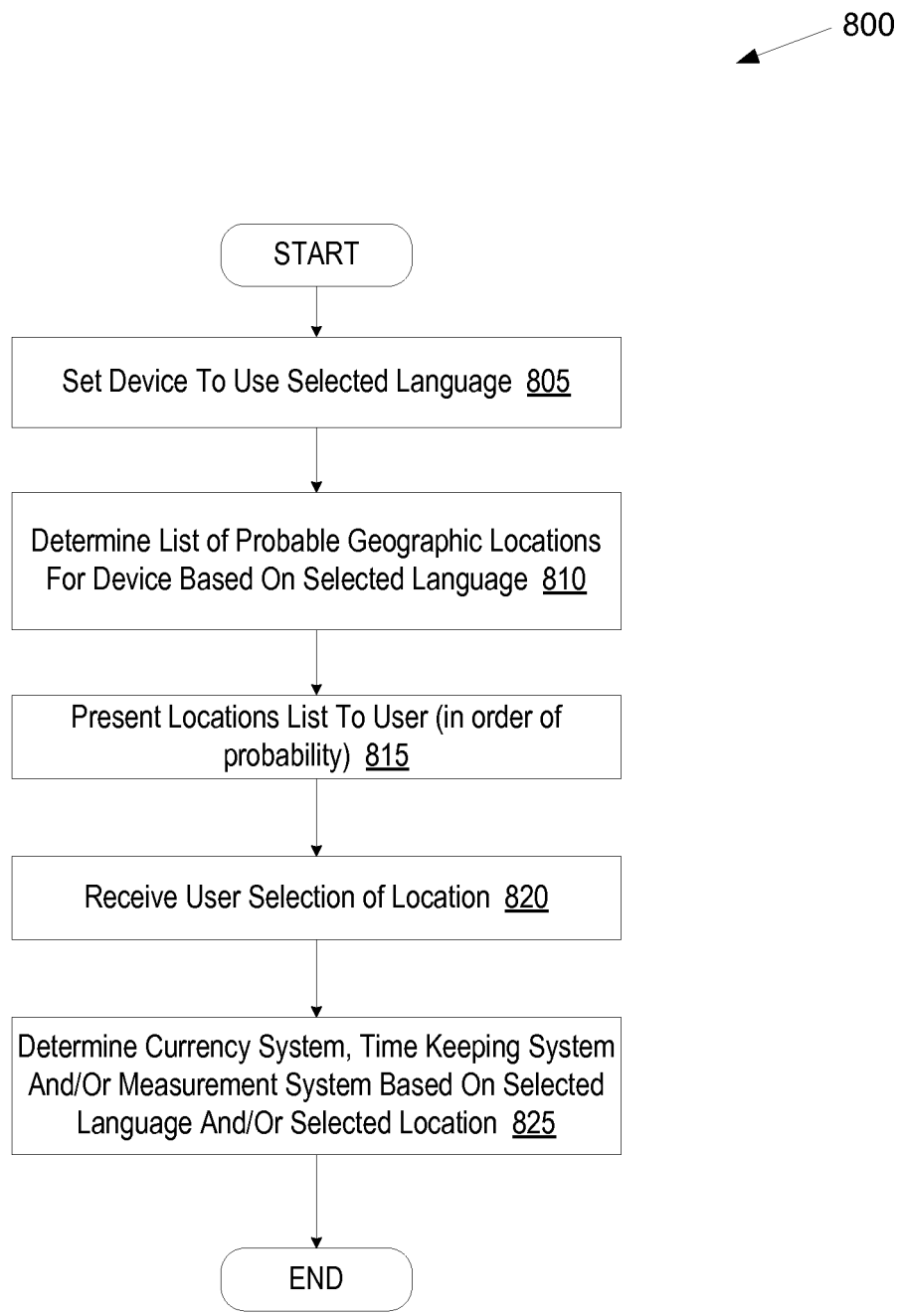
FIG. 8 is a flow diagram of one embodiment for a method of identifying a geographic location and/or other device settings for a device based on a selected language.

FIG. 8 is a flow diagram of one embodiment for a method 800 of identifying a geographic location and/or other device settings for a device based on a selected language. The method is performed by processing logic that may comprise hardware (circuitry, dedicated logic, etc.), software (such as is run on a general purpose computer system or a dedicated machine), or a combination of both. In one embodiment, method 800 is performed by a device (e.g., a device settings selector 120 running on device 105 of FIG. 1).

Referring to FIG. 8, at block 805 of method 800 processing logic sets the device to a selected language. In one embodiment, at block 805 method 500 is performed. At block 810, processing logic determines a list of probable geographic locations for the device based on the selected language. The probable geographic locations may be those locations where the selected language is a commonly spoken or dominant language. In one embodiment, processing logic finds one or more entries for the selected language in a location settings data structure, and notes locations associated with each of those entries. At block 815, processing logic presents the locations list to a user. In one embodiment, processing logic assigns a probability to each of the locations, and orders the locations based on probability. The probability may be based on, for example, comparative population sizes of different locations at which the language is spoken. The locations may then be presented in descending order of probability.

At block 820, processing logic receives a user selection of one of the locations. Processing logic may then set the device to the selected location. At block 825, processing logic determines a currency system, time keeping system, measurement system, etc. based on the selected language and/or selected location. In one embodiment, processing logic finds the selected location in a location settings data structure, and identifies a currency system, time keeping system, etc. associated with that entry. Processing logic may then set the device to the identified currency system, time keeping system, measurement system, and so on. The method then ends.

It is to be understood that the above description is intended to be illustrative, and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. A method comprising:
    searching for an available network by a computing device, wherein a device language setting has not been selected by a user for the computing device;
    automatically sending, by the computing device, an access request message to an identified available network;
    receiving a response to the access request message from the identified available network, the response comprising a portal page that comprises a hypertext markup language (HTML) document to which a captive portal of the identified available wireless network redirects network access requests; and
    selecting, by the computing device, a language for the computing device based on words included in the portal page.

2. The method of claim 1, wherein selecting the language for the computing device comprises:
    comparing the words included in the portal page to entries in a multi-language dictionary;
    determining that the words match particular entries in the multi-language dictionary that correspond to a particular language; and
    selecting the particular language.

3. The method of claim 2, wherein the multi-language dictionary is a lookup table that comprises words commonly used in portal pages of public wireless networks and languages associated with the words.

4. The method of claim 1, wherein selecting the language for the computing device comprises:
    examining a language header included in the HTML document to identify a particular language; and
    selecting the particular language.

5. The method of claim 1, further comprising:
    presenting the selected language to a user on the computing device; and responsive to receiving user confirmation of the selected language, setting the computing device to use the selected language.

6. The method of claim 1, further comprising:
determining a list of probable geographic locations for the computing device based on the selected language, wherein the probable geographic locations are locations where the selected language is a commonly used language; and
presenting the list of probable geographic locations to a user.

7. The method of claim 1, further comprising:
determining one or more of a currency system, a time keeping system or a measurement system based on the selected language.

8. The method of claim 1, further comprising:
parsing contents of the response to the access request message;
determining whether the contents of the response to the access request message include an address; and
responsive to identifying an address, selecting the language based on a language commonly spoken in a region associated with the address.

9. The method of claim 1, wherein the computing device is a portable user device, wherein no language has been set for the portable user device prior to the selecting, and wherein the identified available network is an unencrypted wireless network.

10. A device, comprising:
a memory to store instructions for a device settings selector; and
a processor to execute the instructions, wherein the instructions cause the processor to:
search for available networks;
send an access request to an identified available network;
receive a portal page from the identified available network responsive to the access request; and
select a language for the device based on contents of the portal page.

11. The device of claim 10, wherein the portal page comprises a hypertext markup language (HTML) document to which a captive portal of the identified available network redirects network access requests, and wherein to select the language for the device, the processor performs the following:
compares words included in the portal page to entries in a multi-language dictionary;
determines that the words match particular entries in the multi-language dictionary that correspond to a particular language; and
selects the particular language.

12. The device of claim 11, wherein the multi-language dictionary is a lookup table that comprises words commonly used in portal pages of public wireless networks and languages associated with the words.

13. The device of claim 10, wherein the portal page is a hypertext markup language (HTML) page, and wherein to select the language for the device, the processor performs the following:
examines a language header included in the portal page to identify a particular language; and
selects the particular language.

14. The device of claim 10, further comprising the instructions to cause the processor to:
present the selected language to a user on the device; and
responsive to receiving user confirmation of the selected language, set the device to use the selected language.

15. The device of claim 10, further comprising the instructions to cause the processor to:
determine a list of probable geographic locations for the device based on the language, wherein the probable geographic locations are locations where the language associated with the probable geographic locations is a commonly used language; and
present the list of probable geographic locations to a user.

16. The device of claim 10, further comprising the instructions to cause the processor to:
determine one or more of a currency system, a time keeping system or a measurement system based on the selected language.

17. The device of claim 10, further comprising the instructions to cause the processor to:
parse the contents of the portal page;
determine whether the contents of the portal page include an address; and
responsive to identifying an address, select the language based on a language commonly spoken in a region at which the address is located.

18. The device of claim 10, wherein the device is a portable user device and the identified available network is an unencrypted wireless network.

19. A non-transitory computer readable storage medium including instructions that, when executed by a processing device of a user device, cause the processing device to perform a method comprising:
searching, by the processing device, for available networks;
automatically sending, by the processing device, an access request message to an identified available network;
receiving, by the processing device, a response to the access request message from the identified available network, the response comprising a hypertext markup language (HTML) document; and
selecting, by the processing device, a language for the user device based on contents of the response to the access request message.

20. The non-transitory computer readable storage medium of claim 19, wherein selecting the language for the user device comprises:
comparing words included in the response to the access request message to entries in a multi-language dictionary;
determining that the words match particular entries in the multi-language dictionary that correspond to a particular language; and
selecting the particular language.

21. The non-transitory computer readable storage medium of claim 20, wherein the multi-language dictionary is a lookup table that comprises words commonly used in portal pages of public wireless networks and languages associated with the words.

22. The non-transitory computer readable storage medium of claim 19, wherein selecting the language for the user device comprises:
examining a language header included in the HTML document to identify a particular language; and
selecting the particular language.

23. The non-transitory computer readable storage medium of claim 19, the method further comprising:
determining a list of probable geographic locations for the user device based on the language, wherein the probable geographic locations are locations where the language is a commonly used language;

presenting the list of probable geographic locations to a user; and receiving user selection of one of the probable geographic locations.

24. The non-transitory computer readable storage medium of claim 23, the method further comprising:

determining one or more of a currency system, a time keeping system or a measurement system based on the selected geographic location.

25. The non-transitory computer readable storage medium of claim 19, the method further comprising:

parsing the contents of the response to the access request message;

determining that contents of the response to the access request message include a location;

selecting the location; and selecting the language based on a language commonly spoken at the location.

26. The non-transitory computer readable storage medium of claim 19, wherein the identified available network is an unencrypted wireless network.

\* \* \* \* \*